Dec. 25, 1962 A. E. CHANDLER 3,070,123
VACUUM SAFETY DEVICE FOR TANKS AND THE LIKE
Filed March 24, 1961 2 Sheets-Sheet 1
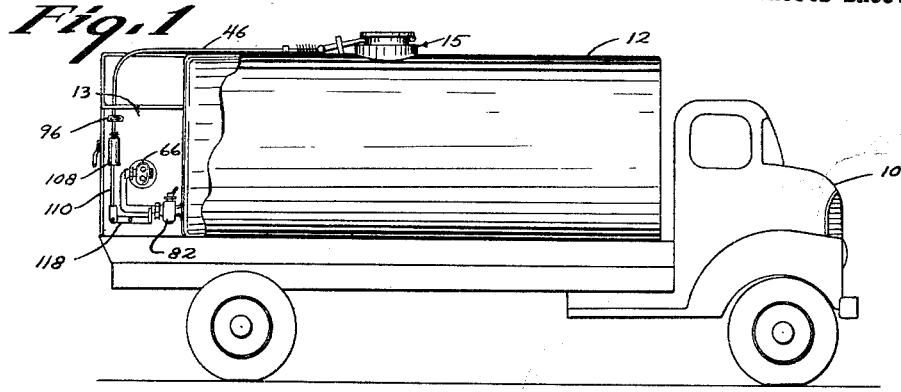
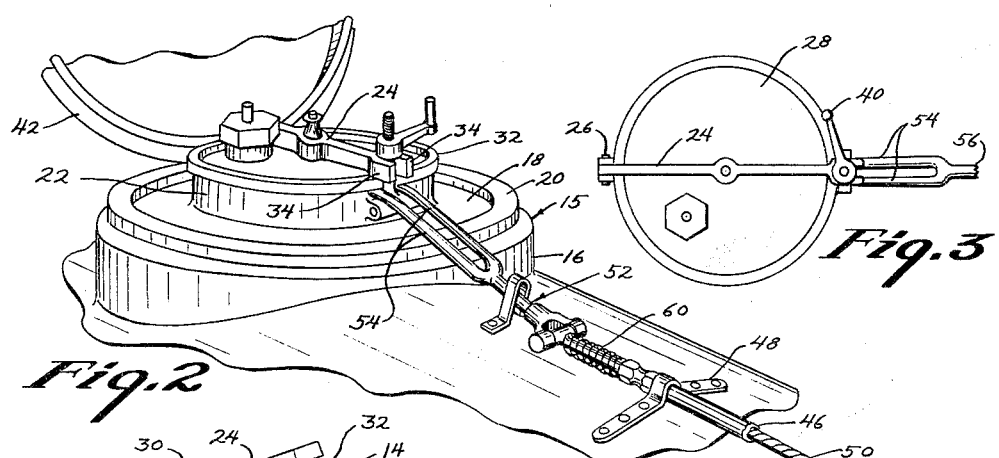
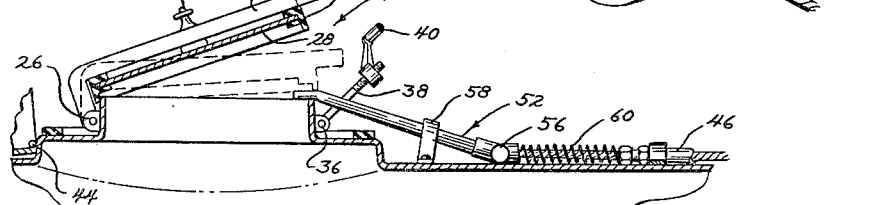
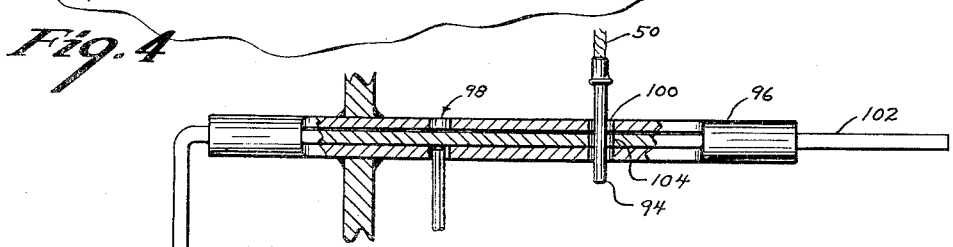
INVENTOR.
ARTHUR E. CHANDLER
BY
Talbert Dick & Farley
ATTORNEYS
WITNESS
NORMAN G. TRAVISS Dec. 25, 1962

A. E. CHANDLER 3,070,123

VACUUM SAFETY DEVICE FOR TANKS AND THE LIKE

Filed March 24, 1961

INVENTOR.
ARTHUR E. CHANDLER
BY
Talbot Dick & Jorby
ATTORNEYS

WITNESS
NORMAN G. TRAVISS

United States Patent Office 3,070,123
Patented Dec. 25, 1962

3,070,123
VACUUM SAFETY DEVICE FOR TANKS
AND THE LIKE
Arthur E. Chandler, 1010 W. Waverly, Bremer County, Waverly, Iowa
Filed Mar. 24, 1961, Ser. No. 98,102
5 Claims. (Cl. 137—585)

My invention relates to safety control means and more particularly to a safety device to protect tanks and the like from the adverse effects of a vacuum. This device is an improvement and modification of the structure described in my co-pending application Serial No. 859,318 filed December 14, 1959, now Patent No. 3,048,189.

Milk transport tanks which are mounted on the chassis of large transport trucks are generally equipped with a manhole in the top thereof. The manhole is used to introduce the milk into the tank and the outlet means is used in conjunction with a pump to remove the milk from the tank when the truck has arrived at a milk processing depot. Many trucks are equipped with electrically operated pumps to assist in emptying the tank but sometimes a pump at the processing plant is utilized. The pump on the truck is usually connected to the outlet means by a suitable conduit and the pump is then actuated by closing an electrical switch whereby the milk is withdrawn from the tank, and discharged through a conduit secured to a discharge port on the pump. When the pump at the plant is utilized instead of the pump on the truck, the conduit connecting the truck pump and outlet means is removed and a separate conduit then connects the outlet means and the processing plant pump.

The manhole is normally opened before any pumping action is started to prevent a vacuum from being created in the tank as a pump unit withdraws the milk from the tank. However, sometimes the operator forgets to open the manhole or on other occasions the manhole becomes inadvertently closed after it has been opened. Either of these happenings will cause a vacuum to be created within the tank as the pump continues to withdraw the milk from the tank. The unfortunate result flowing from the creation of this vacuum is the ultimate collapse of the tank.

Therefore, the principal object of my invention is to provide a vacuum safety device for tanks and the like which will not permit the creation of a vacuum within the tank while fluid is being withdrawn therefrom.

A further object of my invention is to provide a vacuum safety device for tanks and the like which will not permit the removal of fluid from a tank until the manhole has been opened and the "seal" on the tank has been broken.

A still further object of my invention is to provide a vacuum safety device for tanks and the like which will not permit the manhole to re-seal the tank while fluid is being withdrawn therefrom.

A still further object of my invention is to provide a vacuum safety device for tanks and the like which will not in any way impair the sanitation conditions within the tank.

A still further object of my invention is to provide a vacuum safety device for tanks and the like which cannot have its function impaired by ice, snow, or other climatic conditions.

A still further object of my invention is to provide a vacuum safety device for tanks and the like which will prevent the truck pump or the plant pump from being operatively utilized until the manhole on the tank has been opened and the "seal" on the tank has been broken.

A still further object of my invention is to provide a vacuum safety device for tanks and the like which is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims and illustrated in the accompanying drawings, in which:

FIG. 1 is a side elevational view of my device mounted on a truck-tank transport;

FIG. 2 is a perspective view of my device at the point where it is secured to the closed manhole cover;

FIG. 3 is a partial plan view of my device as shown in FIG. 2;

FIG. 4 is a side elevational view of my device at the point where it is secured to the manhole cover when the manhole cover is in an opened condition;

FIG. 5 is a partial sectional view of my control slide mechanism;

Figure 6:
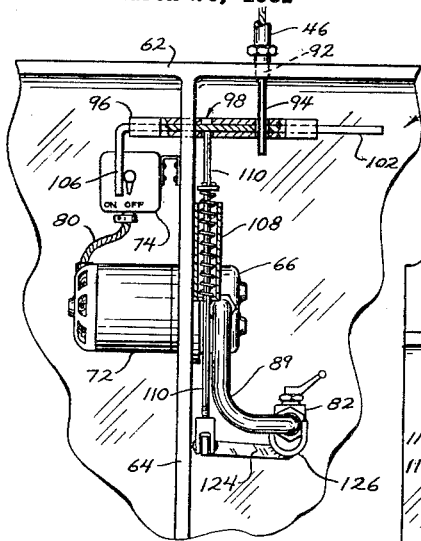
FIG. 6 is a partial rear elevational view of the outlet portion of the tank unit showing the various components in a locked condition.

I have used the numeral 10 to generally designate a transport truck with a conventional tank 12 mounted thereon. Tank 12 has a compartment 13 at its rearward end and a conventional manhole opening 14 located on the top and in the center thereof. The manhole structure 15 which surrounds the manhole opening 14 is comprised of a plurality of elements. A circular shoulder 16 is welded or otherwise secured to the top of tank 12 and a flat top portion 18 extends over the top of this circular shoulder. A circular resilient gasket of rubber or the like 20 is secured in any convenient manner to the top portion 18 of circular shoulder 16. As clearly shown in FIGS. 2 and 4, a second circular shoulder 22 is welded or otherwise secured to the top portion 18 of circular shoulder 16. As shown in FIG. 4, an L-shaped bar 24 is pivotally secured to the outside vertical surface of circular shoulder 22 by means of hinge 26. L-shaped bar 24 is of such dimensions and proportions that it is permitted to extend horizontally over circular shoulder 22 when in its lowered position and the bar is shown to be in this position as depicted in FIG. 2. A lid 28 is secured to the bottom of bar 24 by means of clasp element 30. A circular gasket 32 is secured in any convenient manner to the periphery of the circular lid 28. The size of the circular lid 28 and its position on bar 24 are such that the lid and the circular gasket 32 will register with the circular shoulder 22 when the bar 24 is in its lowered position. This relationship between lid 28 and the circular shoulder 22 is depicted in FIG. 2. The end of bar 24 opposite to hinge 26 is split to form two spaced apart bar portions 34. It is preferred that bar 24 be adapted to pivot in a vertical plane passing through the longitudinal axis of the tank 12.

A horizontal pin 36 is pivotally secured to the vertical side of circular shoulder 22 at a point opposite the location of hinge 26. A threaded bolt 38 is welded or otherwise secured to pin 36 and extends at right angles away from the pin as shown in FIGS. 2 and 4. The threaded bolt 38 is of such length that it can be pivoted upwardly by means of pin 36 and be received between the spaced apart ears 34 on bar 24. A crank 40 is threadably secured to the upper end of bolt 38 and is adapted to forcibly hold the bar 24, lid 28 and circular gasket 32 in binding relationship with the top of circular shoulder 22. A cover 42 is hinged to the circular shoulder 16 at 44 and is adapted to enclose the entire manhole structure 15 at times.

An elongated tubular conduit 46 is secured to tank 12 by means of brackets 48 and extends away from the manhole structure 15 toward one end of tank 12 and thence extends downwardly over the end of tank 12 into compartment 13 to a point just above the bottom of the tank. An elongated cable 50 is movably supported within conduit 46. As shown in FIGS. 2 and 4, conduit 46 terminates at a point slightly removed from the manhole structure 15 and cable 50 protrudes slightly beyond conduit 46 in a direction toward the manhole structure. A fork element 52 having two elongated prongs 54 is pivotally secured to the end of cable 50 by means of hinge element 56 in such a manner that the prongs 54 extend toward and engage the manhole structure 15. The prongs 54 are adapted to receive threaded bolt 38 therebetween at times as shown in FIG. 2. An inverted U-shaped bracket 58 extends over fork element 52 and is secured to tank 12 in any convenient manner to limit the upward movement of the fork with respect to the tank. A spring element 60 embraces the portion of cable 50 that protrudes from conduit 46 and spring element 60 spans the distance between the end of the conduit and the hinge element 56. It should be noted that the distance between the hinge 56 and the end of conduit 46 will determine the state of expansion or contraction that spring 60 has been subjected to. It also should be noted that the extreme tips of the prongs 54 are bent downwardly to a small extent as shown in FIGS. 2 and 4.

Compartment 13 includes a top portion 62 and a vertical wall 64. A pump 66 can be mounted in any convenient fashion to one side of wall 64. Pump 66 has inlet port 68 and outlet port 70. A pump motor 72 is mounted in any convenient fashion to the other side of wall 64 and its power shaft (not shown) extends through wall 64 to operate pump 66 in typical fashion. A switch 74 with toggle 76 is mounted on wall 64 above motor 72 by means of bracket 78. An electrical cable 80 connects switch 74 and motor 72, and switch 74 can in turn be connected to a source of electrical energy (not shown). An outlet valve 82 is mounted on the lower rearward end of tank 12 and includes a control arm 84 and a threaded coupling 86. Control arm 84 can be actuated to allow the milk 88 within the tank to flow through valve 82. Conduit 89 normally detachably extends between valve 82 and the inlet port 68 of pump 66.

Conduit 46 terminates at the top 62 of compartment 13 and is secured thereto by coupling 90. Coupling 90 registers with an aperture 92 in the top 62 of the compartment. A locking pin 94 is secured to the lower end of cable 50 and is adapted to penetrate aperture 92 and extend downwardly into compartment 13.

As shown in FIG. 5, a horizontal sleeve 96 is mounted in wall 64 and the opposite ends of the sleeve extend beyond the opposite sides of the wall. Sleeve 96 is positioned with one of its ends substantially below aperture 92 and locking pin 94, and the other end is positioned above and slightly rearwardly of switch 74. Two pairs of vertically drilled apertures 98 and 100 appear in sleeve 96 on the same side of wall 64 as pump 66. Locking pin 94 is in vertical alignment with apertures 100 and is adapted to be received therein at times. A slide member 102 is slidably mounted within sleeve 96 and an aperture 104 therein is adapted to register at times with either apertures 98 or 100 in sleeve 96. A vertically disposed handle 106 on one end of slide member 102 extends downwardly adjacent toggle 76 on switch 74 when the handle is moved to its closest position to wall 64.

A vertical sleeve 108 is secured to wall 64 adjacent pump 66 in any convenient fashion at a point directly below apertures 98 in sleeve 96. A vertical rod 110 extends through sleeve 108, and its upper end is adapted to be received in apertures 98. As will be pointed out hereafter, slide 102 prevents the complete penetration of apertures 98 by rod 110 at times. A spring 112 rests on the bottom of sleeve 108 and embraces rod 110 as shown in FIG. 6. A washer 114 embraces rod 110 above spring 112 and the washer is held to the rod by weldment 116. Spring 112 is normally under compression so that it urges washer 114 and rod 110 vertically upwardly.

A bar 118 is pivotally secured in an off-center position to wall 64 below pump 66 by means of pin 120. The "light" end 121 of bar 118 is pivotally connected to the lower end of rod 110 by clevis 122. A perpendicular horizontal extension 124 protrudes from the "heavy" end 125 of bar 118 and a U-shaped yoke 126 is welded or otherwise secured thereto. Bar 118 and extension 124 are of such dimension that yoke 126 will embrace the threaded coupling 86 on valve 82 when the "heavy" end 125 of bar 118 is rotated upwardly. The eccentrically located pivot point of bar 118, coupled with the action of spring 112 acting to move rod 110 upwardly cause the yoke 126 to normally pivot away from valve 82 when rod 110 is free to move upwardly.

Figure 7:
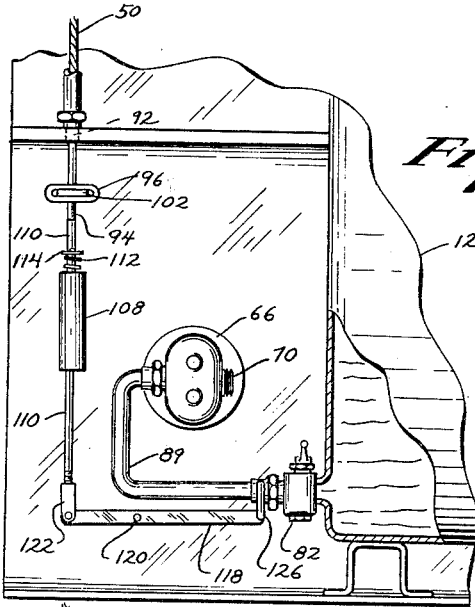
FIG. 7 is a partial side elevational view of the structure shown in FIG. 6.

The normal operation of my device is as follows: When the tank 12 is loaded with fluid and is being transported from one point to another, the manhole structure 15 is closed as is the valve 82. The conduit 89 is normally in the position shown in FIG. 7. The slide member 102 is in a locked position (FIGS. 5 and 6) with the aperture 104 in slide member 102 being in alignment with apertures 100 in sleeve 96 to receive pin 94 therethrough. While in this position, pin 94 prevents any further sliding movement of slide member 102. Rod 110 is being urged upwardly through apertures 98 in the manner described, but, as shown in FIG. 5, slide member 102 prevents the total penetration of rod 110 through sleeve 96. When rod 110 is not allowed to move upwardly, yoke 126 on bar extension 124 embraces the nozzle 86 on valve 82, and as shown in FIG. 7, would prevent the threaded removal of conduit 89 from the nozzle. Also, as shown in FIG. 6, handle 106 prevents the manual movement of toggle 76 to the "on" position to electrically excite the pump motor 72. Thus, with the pin 94 piercing slide member 102 in the manner described and shown in FIG. 5, the switch 74 is rendered inoperable and yoke 126 prevents any conduit from being attached or detached from the closed valve 82.

The manhole structure is closed by forcing fork 52 toward conduit 46 to compress spring 60. This movement of fork 52 is continued until the outer tips of the prongs 54 engage the exterior surface of the circular shoulder 22 as shown in FIG. 2. This movement of the fork 52 forces the cable 50 downwardly through conduit 46 so that the pin 94 on the lower end of the cable will move through the registering apertures 100 and 104 in sleeve 96 and slide member 102, respectively. When the fork 52 is in the above described position, the L-shaped bar 24 and lid 28 are pivoted downwardly to engage the top of circular shoulder 22. Threaded bolt 38 is pivoted upwardly between the spaced apart ears 34 on the end of L-shaped bar 24 and crank 40 can then be moved downwardly on bolt 38 to bind the bar 24, the lid 28 and the circular gasket 32 against the top of circular shoulder 22. This action seals the tank 12. The cover 42 can thereupon be pivoted downwardly to engage the circular gasket 20 and any satisfactory means can be used to keep the cover in this position. An opening in the cover permits fork 52 to extend through the cover when the cover is in this closed condition. Since this feature is not part of my invention, the opening in the cover has not been shown. When the manhole structure 15 is in its closed condition, as described above, the outer ends of the prongs 54 of fork 52 are being urged against the exterior side of circular shoulder 22 by spring 50 and are further held against movement by the lid 28, gasket 32, and bolt 38 as shown in FIG. 2. Therefore, the only way to displace the fork 52 is to open the manhole structure 15.

The cover 42 can be retracted to a position shown in FIG. 2 and the crank 40 can be disengaged so that bolt 38 can pivot downwardly away from the spaced apart ears 34 on the end of bar 24. This will permit the bar 24 and the lid 28 to be pivoted upwardly as shown in FIG. 5. This action will permit the spring 60 to force the prongs 54 of fork 52 to a position over and above the top of shoulders 22. This displacement of fork 52 will slightly withdraw the cable 50 from the conduit 46 which in turn will withdraw the pin 94 from the registering apertures 100 and 104 in sleeve 96 and slide member 102, respectively.

Figure 8:
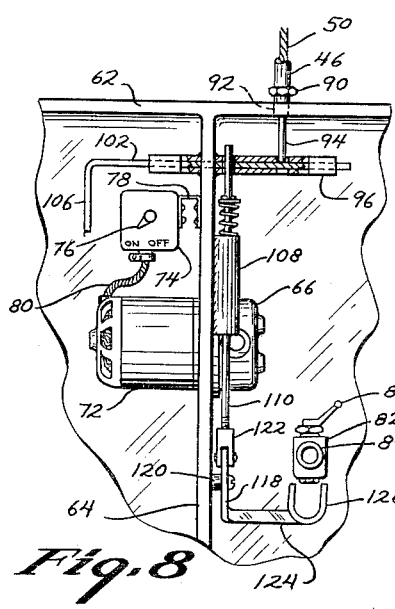
FIG. 8 is a partial rear elevational view of the outlet portion of the tank unit similar to FIG. 6 except the components are in an unlocked condition.
Figure 9:
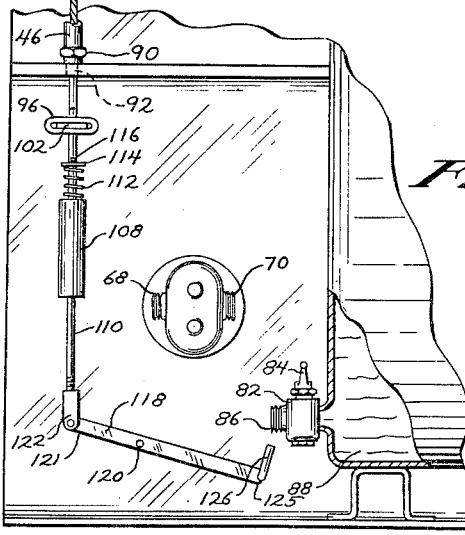
FIG. 9 is a partial side elevational view of the structure shown in FIG. 8.

If the operator desires to utilize the truck pump 66 to empty tank 12, a suitable conduit is secured to the outlet port 70 of the pump. The valve 82 can be opened by control arm 84. The slide member 102 is then pulled to the position shown in FIG. 8 so that the toggle 76 can be actuated to start the pump motor 72. No vacuum can then be created in tank 12 during the pumping operation because the manhole structure 15 has been opened. Furthermore, if the lid 28 and bar 24 should inadvertently be moved to their closed position, they will assume the position shown by the dotted lines in FIG. 4 and rest on top of the prongs 54 of fork 52. Thus, the inadvertent closing of lid 28 after the valve 62 has been opened in the manner described will absolutely prevent a vacuum from being created in the tank even then because the outer tips of the prongs 54 will not allow the lid 28 to seal the manhole opening 14.

If it is desired to use a pump at the processing plant to unload tank 12 instead of pump 66, the slide member 102 is moved to a position in sleeve 96 so that apertures 98 in the sleeve register with aperture 104 in the slide member. This registering of apertures 98 and 104 will allow rod 110 to move upwardly therethrough in the manner described, which will cause yoke 126 to be pivoted downwardly away from valve 82. Conduit 89 can then be easily removed from nozzle 86 and the valve 82 can then be connected directly to the plant pump by any suitable conduit. A vacuum will not be created within tank 12 during this pumping operation for the same reasons stated above.

From the foregoing it is seen that the fluid pumping operation cannot even begin until the manhole cover has been opened and the inadvertent closing of the manhole cover will still not seal the tank and permit a vacuum to be created after the pumping operation has already started. Furthermore, the "seal" on tank 12 will be broken regardless of whether the operator uses the tank pump 66 or the pump at the processing plant, because neither pump can be actuated until locking pin 94 is withdrawn from its locking position in the manhole opening operation. Thus, it is seen that my device will accomplish at least all of its stated objectives.

Some changes may be made in the construction and arrangement of my vacuum safety device for tanks and the like without departing from the real spirit and purpose of my invention, and it is my intention to cover by my claims, any modified forms of structure or use of mechanical equivalents which may be reasonably included within their scope.

I claim:

1. In combination, a tank adapted to contain fluid, an electrically powered pump on said tank, an electrical switch operatively connected to said pump whereby said pump is operatively controlled by said switch, an actuating toggle movably secured to said switch and movable from a first position wherein said switch is off to a second position wherein said switch is on, an outlet valve on said tank, a threaded nozzle on said outlet valve, yoke means pivotally secured to said tank and biased from a first position embracing said nozzle toward a second position wherein said yoke means is spaced from said nozzle, means slidably connected to said tank and normally positioned simultaneously in the path of said toggle and in the path of said yoke means thereby blocking movement of said toggle and said yoke means out of their respective first positions, said slidable means movable to a position out of said movement blocking positions, an access opening in the top of said tank, closure means on said tank for movement between a position opening said access opening to a position closing said access opening to seal said tank, and means operatively connected to said closure means and said slidable means and movable from a position in the path of movement of said slidable means, when said closure means is in the closure-closing position, to a position out of the path of movement of said slidable means, when said closure means is in the closure-opening position.

2. In combination, a tank adapted to contain fluid, a pump means on said tank, an electrical power means operatively secured to said pump and adapted to be connected to a source of electrical power, an electrical switch operatively connected to said pump and said power means to operatively control said pump, a movable toggle secured to said switch to control said switch, an outlet valve on said tank, a threaded nozzle on said outlet valve, a yoke means pivotally secured to said tank and being capable of being pivoted to embrace said nozzle at times, a slide member slidably secured to said tank, a handle portion of said slide means dwelling in the movable path of said toggle at times, means connecting said slide member and said yoke means to permit said yoke means to pivot away from said nozzle upon a predetermined sliding movement of said slide member, said handle portion of said slide means normally dwelling in the path of said toggle when said yoke is embracing said nozzle, an access opening in the top of said tank, a closure means on said tank for closing said access opening at times to seal said tank, and means on the outside of the tank mechanically operatively connecting said slide member and said closure means to prevent the sliding movement of said slide member before said closure means is opened.

3. In combination, a tank adapted to contain fluid, a pump means on said tank, an electrical power means operatively secured to said pump and adapted to be connected to a source of electrical power, an electrical switch operatively connected to said pump and said power means to operatively control said pump, a movable toggle secured to said switch to control said switch, an outlet valve on said tank, a threaded nozzle on said outlet valve, a yoke means pivotally secured to said tank and being capable of being pivoted to embrace said nozzle at times, a slide member slidably secured to said tank, a handle portion of said slide means dwelling in the movable path of said toggle at times, means connecting said slide member and said yoke means to permit said yoke means to pivot away from said nozzle upon a predetermined sliding movement of said slide member, said handle portion of said slide means normally dwelling in the path of said toggle when said yoke is embracing said nozzle, an access opening in the top of said tank, a closure means on said tank for closing said access opening at times to seal said tank, an elongated hollow conduit on the outside of said tank and extending between said closure means and said slide member and a flexible cable in said conduit and operatively connected by its opposite ends to said closure means and said slide member to prevent said slide member from being moved before said closure means is opened.

4. In combination, a tank adapted to contain fluid, a pump means on said tank, an electrical power means operatively secured to said pump and adapted to be connected to a source of electrical power, an electrical switch operatively connected to said pump and said power means to operatively control said pump, a movable toggle secured to said switch to control said switch, an outlet valve on said tank, a threaded nozzle on said outlet valve, a yoke means pivotally secured to said tank and being capable of being pivoted to embrace said nozzle at times, a slide member slidably secured to said tank, a handle portion of said slide means dwelling in the movable path of said toggle at times, means connecting said slide member and said yoke means to permit said yoke means to pivot away from said nozzle upon a predetermined sliding movement of said slide member, said handle portion of said slide means normally dwelling in the path of said toggle when said yoke is embracing said nozzle, an access opening in the top of said tank, a closure means on said tank for closing said access opening at times to seal said tank, an elongated hollow conduit on the outside of said tank and extending between said closure means and said slide member, a flexible cable in said conduit and operatively connected by its opposite ends to said closure means and said slide member to prevent said slide member from being moved before said closure means is opened, and means yieldably secured to said cable to move into the path of said closure means after said closure means has been opened to yieldably prevent the re-sealing of said tank.

5. In combination, a tank adapted to contain fluid, a pump means on said tank, an electrical power means operatively secured to said pump and adapted to be connected to a source of electrical power, an electrical switch operatively connected to said pump and said power means to operatively control said pump, a movable toggle secured to said switch to control said switch, an outlet valve on said tank, a threaded nozzle on said outlet valve, a yoke means pivotally secured to said tank and being capable of being pivoted to embrace said nozzle at times, a slide member slidably secured to said tank, a handle portion of said slide means dwelling in the movable path of said toggle at times, means on said yoke means normally urging said yoke means to pivot away from said nozzle, a rod operatively secured to said nozzle and adapted to move toward said slide member when said yoke means is urged to pivot away from said nozzle, an aperture in said slide member adapted to receive said rod when said slide member is moved to a position where said aperture will register with said rod, said rod adapted to penetrate said slide member when said rod registers with said aperture to permit said yoke means to pivot away from said nozzle, said handle portion of said slide means normally dwelling in the path of said toggle when said yoke is embracing said nozzle, an access opening in the top of said tank, a closure means on said tank for closing said access opening at times to seal said tank, an elongated hollow conduit on the outside of said tank and extending between said closure means and said slide member, a flexible cable in said conduit operatively connected by one of its ends to said closure means, and a locking pin on the other end of said cable; said aperture in said slide member receiving said locking pin at times to prevent sliding of said slide member; said cable being of such length that the opening of said closure means will withdraw said locking pin from the aperture of said slide member.

References Cited in the file of this patent
UNITED STATES PATENTS

| | | |
|---|---|---|
| 1,052,938 | McKeen | Feb. 11, 1913 |
| 1,355,205 | Woodward | Oct. 12, 1920 |

UNITED STATES PATENT OFFICE
CERTIFICATE OF CORRECTION

Patent No. 3,070,123                          December 25, 1962

Arthur E. Chandler

It is hereby certified that error appears in the above numbered patent requiring correction and that the said Letters Patent should read as corrected below.

Column 8, lines 24 and 25, for "of said closure means will withdraw said locking pin from member; said cable being of such length that the opening" read -- member; said cable being of such length that the opening of said closure means will withdraw said locking pin from --.

Signed and sealed this 31st day of March 1964.

(SEAL)
Attest:
ERNEST W. SWIDER

Attesting Officer

EDWARD J. BRENNER

Commissioner of Patents